United States Patent [19]
Yui et al.

[11] Patent Number: 5,471,306
[45] Date of Patent: Nov. 28, 1995

[54] METHOD FOR ASSEMBLING OPTICAL ISOLATOR AND METHOD FOR MEASURING ISOLATION

[75] Inventors: Dai Yui; Shigeru Hirai; Shigeru Semura, all of Yokohama, Japan

[73] Assignee: Sumitomo Electric Industries, Ltd., Osaka, Japan

[21] Appl. No.: 296,802

[22] Filed: Aug. 26, 1994

[30] Foreign Application Priority Data

Aug. 27, 1993 [JP] Japan .................................. 5-212552

[51] Int. Cl.⁶ .................................................. G02F 1/09
[52] U.S. Cl. .................................................. 356/367
[58] Field of Search ............................ 356/364, 365, 356/366, 367; 250/225

[56] References Cited

U.S. PATENT DOCUMENTS

| | | | |
|---|---|---|---|
| 5,278,853 | 1/1994 | Shirai et al. | 372/37 |
| 5,298,972 | 3/1994 | Heffner | 356/364 |
| 5,386,484 | 1/1995 | Ooka et al. | 385/11 |

FOREIGN PATENT DOCUMENTS 0472728  3/1992  European Pat. Off. .

540243  2/1993  Japan .

OTHER PUBLICATIONS

Dexter et al., "Ultraviolet Optical Isolators Utilizing KDP–Isomorphs", Optics Communications, vol. 80, No. 2, Dec. 15, 1990, pp. 115–118.

Kuwahara et al., "An Optical Isolator for Semiconductor Lasers in the 0.8 μm Range", Optics Communications, vol. 40 No. 2, Dec. 1981, pp. 99–104.

*Primary Examiner*—Richard A. Rosenberger
*Attorney, Agent, or Firm*—Cushman Darby & Cushman

[57] ABSTRACT

A method for assembling an optical isolator comprises a step for constructing a measuring system in which a light source, a lens system, a polarizer, an analyzer, and a light receiver are arranged in this order, and light projected from the light source and then transmitted through the lens system, the polarizer, and the analyzer, is received by the light receiver; a step for arranging optical elements for constituting a main body of the optical isolator between the polarizer and the analyzer; a step for measuring a maximum value and a minimum value in levels of the light received by the light receiver while the analyzer is rotated, thereby calculating a ratio of the minimum value to the maximum value; and a step for adjusting rotation positions of the respective components for constituting the main body of the optical isolator in order that the ratio becomes minimal.

9 Claims, 5 Drawing Sheets

METHOD FOR ASSEMBLING OPTICAL ISOLATOR AND METHOD FOR MEASURING ISOLATION

BACKGROUND OF THE INVENTION

1. Field of the Invention

The present invention relates to a method for assembling an optical isolator in such a way that it facilitates easily checking isolation at an assembly stage of a main body of an optical isolator which can be used in an optical fiber communication and so on, and to a method for measuring isolation of the optical isolator.

2. Description of Prior Art

FIG. 1 schematically shows an arrangement of one example of a typical optical isolator main body. As illustrated in FIG. 1, the main body 1 of the optical isolator is constructed of a birefringence crystal plate 11, a half-wave plate 12, a magneto-optic crystal plate having the Farady effect (Farady rotator) 13, another birefringence crystal plate 14, and a magnet 15. The birefringence crystal plate 11, the half-wave plate 12, the Farady rotator 13, and the birefringence crystal plate 14 are sequentially arranged in this sequence is the direction, whereas the magnet 15 is arranged in such a manner that the Farady rotator 13 is magnetized.

It should be noted that the birefringence crystal plate 11 is positioned in such a manner that the crystal optic axis thereof is inclined with respect to the propagation direction, and light incident upon this birefringence crystal plate 11 is separated into two types of rays whose planes of vibration are located perpendicular to each other (namely, ordinary ray and extraordinary ray). Within the birefringence crystal plate 11, the ordinary ray is advanced along a straight line, whereas the extraordinary ray is traveled along an inclined line. However, after these rays emanate from the crystal plate 11, they are traveled as mutually parallel rays along the propagation direction. The half-wave plate 12 owns a crystal axis along such a direction that is inclined by 67.5 degrees along the counterclockwise direction (as viewed from the left direction in FIG. 1) from a direction defined when the optic axis of the birefringence crystal plate 11 is projected onto its surface (hereinafter referred to as the projected direction).

Therefore, the vibration planes of the rays incident on the half-wave plate 12 are inclined around the propagation direction with respect to the crystal axis by 67.5 degrees and −22.5 degrees, respectively. The rays passed through this half-wave plate 12 are rotated by double the angle of 67.5 degrees and −22.5 degrees, respectively (the extraordinary ray is rotated by 135 degrees along the counterclockwise direction and the ordinary ray is rotated by 45 degrees along the clockwise direction; the direction of rotation is defined as viewed from the light incident side along the forward or reverse direction of the optical isolator in this description). As a consequence, the vibration planes of the rays passed through the half-wave plate are apparently rotated by 45 degrees along the clockwise direction, respectively.

The vibration planes of the rays passed through the Farady rotator 13 is rotated by 45 degrees, respectively. The other birefringence crystal plate 14 has a similar effect to that of the above-mentioned birefringence crystal plate 11. The crystal optical axis of this birefringence crystal plate 14 is arranged in such a way that this optic axis is directed to the same direction as that of the above-mentioned birefringence crystal plate 11.

To avoid the return light reflected from the optical isolator per se in the above-described arrangement, the respective optical elements are arranged to be inclined by a certain angle in order not to position the incident light at a right angle with respect to the surfaces of the respective elements.

Next, an explanation will be made of operations of the optical isolator main body 1.

Non-polarized light 10 which is incident from the left direction upon the optical isolator main body 1, is separated within the birefringence crystal plate 11 into two types of rays having polarization mutually located perpendicular to each other (ordinary ray, and extraordinary ray). Both of the polarization directions (the plane of vibration) of the rays are apparently rotated by 45 degrees along the clockwise direction, respectively, as a result of passing the half-wave plate 12. The polarization directions of the rays passed the Farady rotator 13 are further rotated by 45 degrees along the clockwise direction, respectively.

Accordingly, both the ordinary ray and the extraordinary ray, which have projected from the birefringence crystal plate 11, are incident on another birefringence crystal plate 14 under such a condition that the respective polarization directions are rotated by 90 degrees along the clockwise direction. Since the birefringence crystal plate 14 is so arranged that the optic axis thereof is directed to the same optic axis of the birefringence crystal plate 11, both the ordinary ray and the extraordinary ray from the birefringence crystal plate 11 are incident on another birefringence crystal plate 14 as extraordinary ray and ordinary ray, respectively. Among them, the extraordinary ray is obliquely propagated, and then the ordinary ray and the extraordinary ray are again synthesized to be projected.

Subsequently, light incident from the right direction on this optical isolator main body 1 will now be considered. The incident light 10' is separated by the birefringence crystal plate 14 into two types of rays having polarization directions mutually perpendicular to each other (namely, ordinary ray propagated along the straight line and extraordinary ray propagated along the oblique line). Both of the ordinary ray and the extraordinary ray are incident upon the Farady rotator 13. Due to the non-reciprocal characteristic of the Farady rotator 13, the polarization directions of the respective rays passed through the Farady rotator 13 are rotated by 45 degrees along the counterclockwise direction (In this case, the light incident side is on the right of FIG. 1).

Furthermore, these rays pass through the half-wave plate 12. At this time, the polarization directions of these rays are apparently rotated by 45 degrees along the clockwise direction, respectively, as a result of passing through the half-wave plate 12. Consequently, the polarization states of these rays are returned to those obtained when the rays pass through the birefringence crystal plate 14.

As a consequence, both the ordinary ray and the extraordinary ray of the birefringence crystal plate 14 are incident upon this birefringence crystal plate 11 as ordinary ray and extraordinary ray, respectively. Accordingly, these two rays passed through the birefringence crystal plate are more strongly separated, and thus are projected from positions different from the incident position of the light 10.

As described above, the optical isolator shown in FIG. 1 can completely separate the incident position of the first non-polarized light which is incident from the left side on this optical isolator (along the forward direction) from the emanating position of the second non-polarized light which is incident from the right side on the emanating position of the first non-polarized light of this optical isolator (along the reverse direction).

In such an optical isolator main body, it is required to correctly adjust the positions of the constructive elements and the crystal axes. Among others, positioning of the half-wave plate becomes critical, because the crystal axis thereof must be fixed along a predetermined direction. Moreover, since all of the loss (insertion loss) along the forward direction, the reflection attenuation amount, and also isolation must be satisfied at the same time, the optical characteristics of this optical isolator need to be confirmed at the assembling stages of the optical isolator.

On the other hand, isolation is expressed by a ratio of a power level of light transmitted through the optical isolator along reverse direction to that obtained when the light incident on the optical isolator. As a consequence, conventionally, the optical characteristics could not be checked at the stages while the main body of the optical isolator is being assembled. Then, as illustrated in FIG. 2, the main body 1 is fixed within the housing 16, and isolation is measured after the optical fibers 18 are mounted via the collimating lenses 17 on both sides of this housing 16 in the conventional optical isolator.

Since isolation is greatly and adversely influenced by a light shift in a vertical direction of the optical axis of the optical isolator, the collimating lenses 17 should be positioned in front of, and rear the main body 1 of the optical isolator in order to make the optical axes precisely coincident when isolation is measured. However, such a correct adjustment of the optical axes cannot be easily achieved, and lengthy working operation is required.

SUMMARY OF THE INVENTION

An object of the present invention is to provide a method for assembling an optical isolator capable of solving the above-described conventional problems.

Another object of the present invention is to provide a method for assembling a main body of an optical isolator while isolation of the optical isolator is adjusted.

A further object of the present invention is to provide an isolation measuring method of an optical isolator, capable of obtaining isolation in a half way when the main body of the optical isolator is assembled.

According to a first aspect of the present invention, there is provided method for assembling an optical isolator, comprising the steps of:

constructing a measuring system in which a light source, a lens system, a polarizer, an analyzer, and a light receiver are arranged in this order, and light projected from the light source and then transmitted through the lens system, the polarizer, and the analyzer, is received by the light receiver;

arranging optical elements for constituting a main body of the optical isolator between the polarizer and the analyzer;

measuring a maximum value and a minimum value in levels of the light received by the light receiver while the analyzer is rotated, thereby to calculate a ratio of the minimum value to the maximum value; and adjusting rotation positions of the respective optical elements in order that the ratio becomes minimal.

According to a second aspect of the present invention, there is provided method for assembling an optical isolator, comprising the steps of:

constructing a measuring system in which a light source, a lens system, a polarizer, an analyzer, and a light receiver are arranged in this order, and light projected from the light source and then transmitted through the lens system, the polarizer, and the analyzer, is received by the light receiver;

arranging optical elements for constituting the main body of the optical isolator between the polarizer and the analyzer;

measuring a maximum value and a minimum value in levels of the light received by the light receiver while the analyzer is rotated every time the components are rotated and stopped, thereby to calculate a ratio of the minimum value to the maximum value; and adjusting rotation positions of the respective optical elements to the rotation position of the optical elements where a ratio of the maximum value to the minimum value becomes maximal.

Here, both the measurement of the maximum value and the minimum value, and also the adjustment of the rotation positions by the measurement may be performed for each of the optical elements of the main body of the optical isolator.

Here, both the measurement of the maximum value and the minimum value, and also the adjustment of the rotation positions by the measurement may be carried out for each of the optical elements of the main body of the optical isolator, and furthermore these measurement and adjustment operation are repeated several times.

Here, a half-wave plate may be arranged on the light emanating side of the polarizer, and a positional alignment of the polarizer with respect to the main body of the optical isolator along the rotation direction may be carried out by rotating the half-wave plate in stead of the polarizer.

A quarter-wave plate may be arranged on the light incident side of the polarizer.

According to a third aspect of the present invention, there is provided method for measuring isolation of an optical isolator, comprising the steps of:

constructing a measuring system in which a light source, a lens system, a polarizer, an analyzer, and a light receiver are arranged in this order, and light projected from the light source and then transmitted through the lens system, the polarizer, and the analyzer, is received by the light receiver;

arranging the main body of the optical isolator between the polarizer and the analyzer;

measuring a maximum value and a minimum value in levels of the light received by the light receiver while the analyzer is rotated; and setting as isolation a value indicative of a ratio of the minimum value to the maximum value in unit of dB.

Here, a half-wave plate may be arranged on the light emanating side of the polarizer, and a positional alignment of the polarizer with respect to the main body of the optical isolator along the rotation direction may be carried out by rotating the half-wave plate instead of the polarizer.

A quarter-wave plate may be arranged on the light incident side of the polarizer.

The isolation measuring method according to the present invention is featured such that isolation may be obtained by measuring the power levels of the light in front of and rear the optical isolator when the analyzer is rotated by 90 degrees in the measuring system as shown in FIG. 3 to FIG. 5, for example. Since no lens is provided in front of the light receiver during this isolation measurement, it is not required to perform precise axial alignment, resulting in a simple isolation measurement.

Accordingly, in accordance with the isolation measuring method of the present invention, the alignment of the constructive components of the optical isolator main body can be adjusted while measuring isolation of this optical isolator main body.

Then, after isolation of the optical isolator main body has been adjusted, this main body may be assembled into the housing. As a result, the overall optical isolator can be adjusted and correctly assembled within a short time period.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
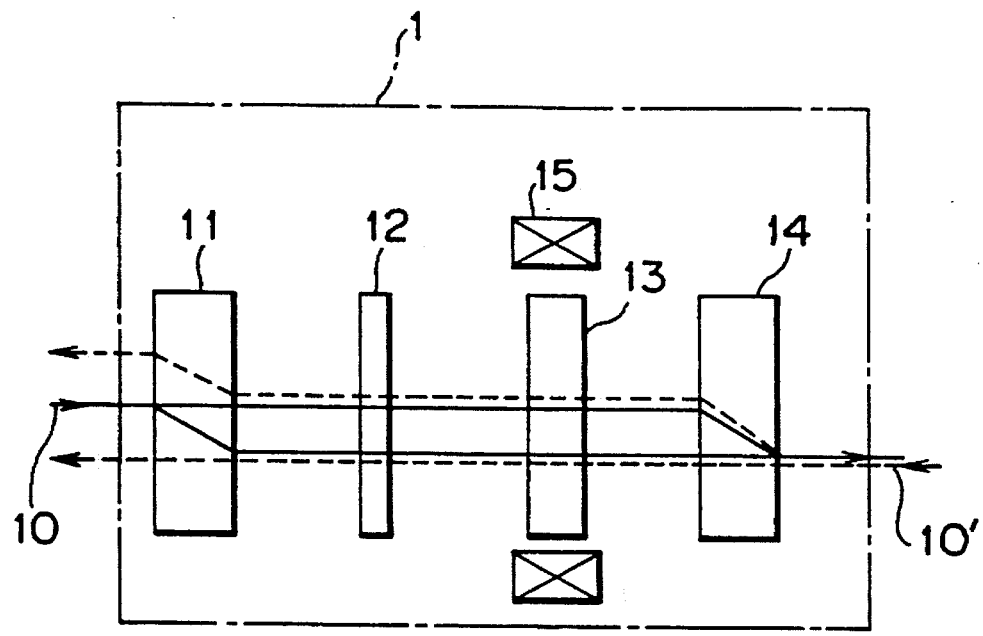
FIG. 1 is a schematic diagram showing an arrangement of one example of an optical isolator main body.
Figure 2:
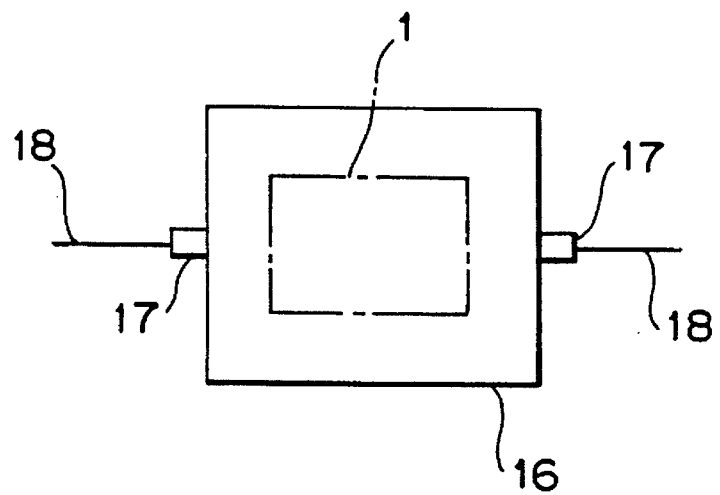
FIG. 2 is a schematic diagram showing an optical isolator with assembling a main body of an optical fiber.

Hereinafter, the present invention will be described in more detailed with reference embodiments. However, the present invention should not be contoured as being limited thereto.

Referring now to the accompanying drawings, a preferred embodiments of the present invention will be described. It should be understood that like reference numerals represent identical, or similar components in the drawings, and therefore no further descriptions thereof will be made in the following description.

Figure 6:
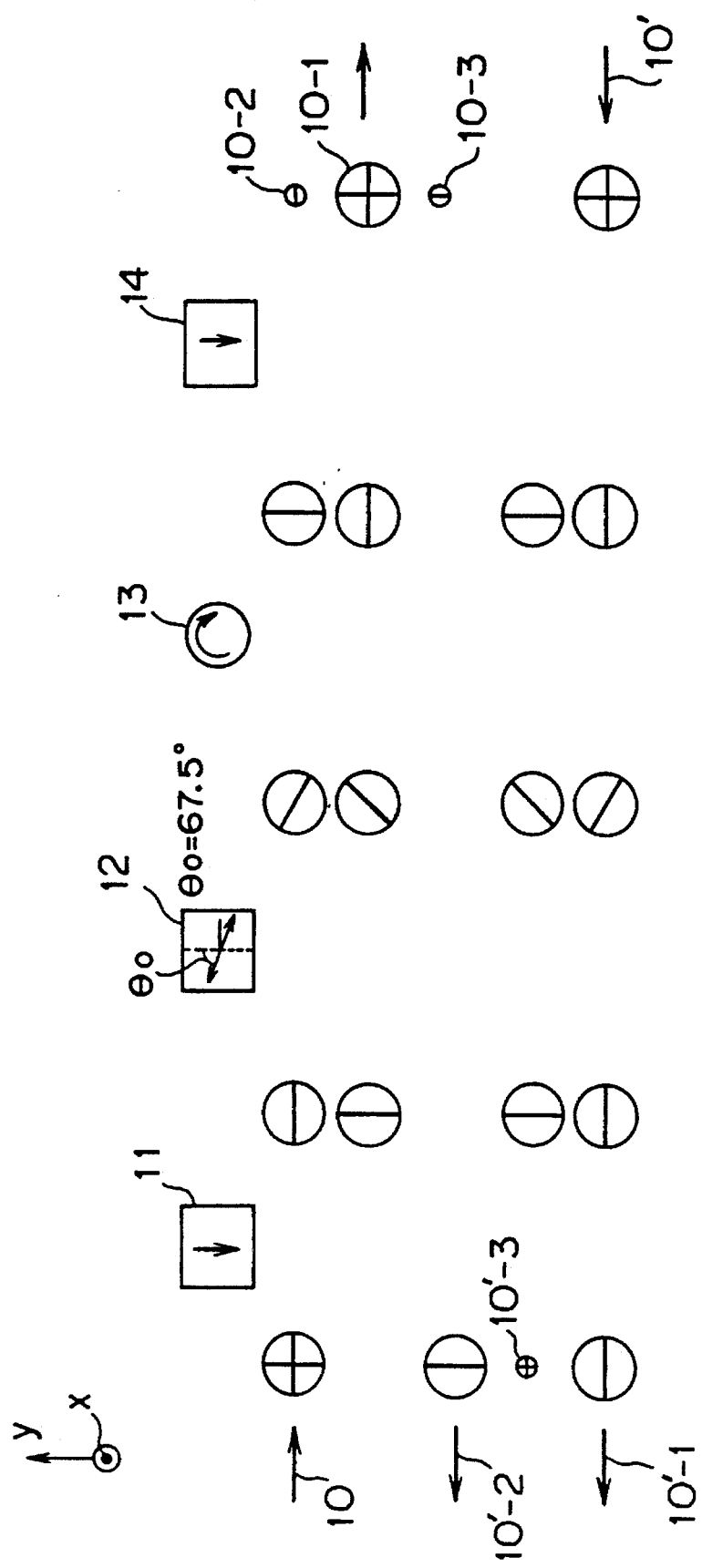
FIG. 6 is a schematic illustration for explaining the measuring principle of the isolation measuring method according to the present invention.

First, the isolation measuring method according to the present invention will now be described with reference to FIG. 6. It should be noted that an arrangement of an optical isolator main body 1 is similar to that shown in FIG. 1, and thus a further explanation is omitted in the following descriptions. The functions of this optical isolator main body 1 will now be explained with reference to FIG. 6. In FIG. 6, the respective elements are indicated as a front view, as viewed from the light incident side along the forward direction (from the left direction in FIG. 6), and arrows in these elements denote crystal axes, as seen from the light incident side along the forward direction (the direction of rotation is defined as viewed from the light incident side along the forward or reverse direction of the optical isolation).

As shown in FIG. 6, non-polarized incident light 10 which has been incident on this optical isolator along the forward direction is separated by way of a birefringence crystal plate 11 into two types of rays whose polarization planes are located perpendicular to each other (namely, ordinary ray and extraordinary ray). The polarization planes of these rays are apparently rotated by 45 degrees along the clockwise direction, respectively, as a result of passing a half-wave plate 12. Furthermore, the polarization planes of the rays are rotated by 45 degrees along the clockwise direction by means of a Farady rotator 13. Two types of rays derived from the Farady rotator 13 are synthesized with each other by another birefringence crystal plate 14.

On the other hand, non-polarized incident light 10' which has been incident upon this optical isolator along the reverse direction is separated by way of the birefringence crystal plate 14 into two types of rays whose polarization planes are located perpendicular to each other. Subsequently, the two types of rays are processed in such a manner that the polarization planes thereof are rotated by 45 degrees along the counterclockwise direction by the Farady rotator 13. Furthermore, the polarization plates of the rays passed through the half-wave plate 12 are apparently rotated by 45 degrees, respectively, as a result of passing the half-wave plate 12. The two types of rays outgoing from this half-wave plate 12 are not synthesized with each other at the birefringence crystal plate 11, but are projected from positions axially shifted from the incident positions along the forward direction.

Here, when the respective optical elements would be ideally positioned, the emanating light under such a condition that the non-polarized light 10 is incident along the forward direction, is only the non-polarized light 10-1. However, when the crystal axis of any of these optical elements would be shifted from the ideal direction, two side spots 10-2 and 10-3 would appear. On the other hand, when the respective optical elements would be ideally located, the emanating light under such a condition that the non-polarized light 10' is incident along the reverse direction, is only the emanating light 10'-1 and 10'-2. However, if the crystal axis of any of these optical elements would be shifted from the ideal direction, a side spot 10'-3 would appear at the incident position along the forward direction.

Normally, the thickness of the half-wave plate 13 is selected to be 0.1 ram, and therefore this half-wave plate 13 cannot be easily handled, as compared with the birefringence crystal plates 11 and 14 whose thicknesses are on the order of 1 mm. That is to say, it is difficult to control positioning of the half-wave plate 12 during assembling. As a consequence, the direction of the crystal axis of the half-wave plate 12 would be very easily shifted while the respective optical elements are positioned. It should be noted that the typical thickness of the Farady rotator 13 is on the order of 0.4 mm, and therefore this Farady rotator 13 becomes relatively difficult to be handled, but the direction of the crystal axis of the Farady rotator 13 never gives adverse influences to such a characteristic to rotate the polarized wave.

Under such circumstance, consider that the crystal axis of the half-wave plate 12 is shifted by "Δθ" from the setting direction "θ₀" (namely, the direction inclined by 67.5 degrees from the direction which the crystal axes of the birefringence crystal plates 11 and 14 are projected onto the surface the half-wave plate 12).

Figure 7A:
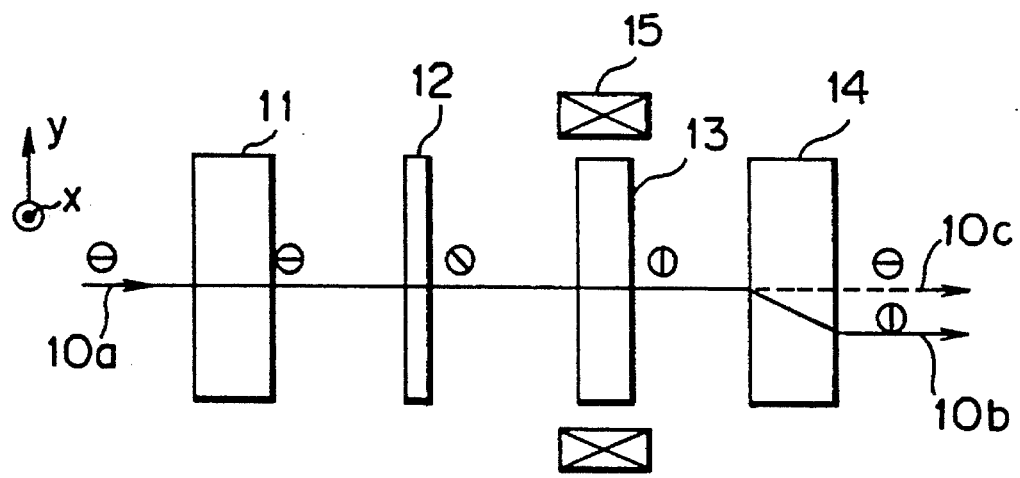
FIG. 7A and FIG. 7B are schematic diagrams showing such a case that linearly polarized light is incident upon the main body of the optical isolator indicated in FIG. 1.
Figure 7B:
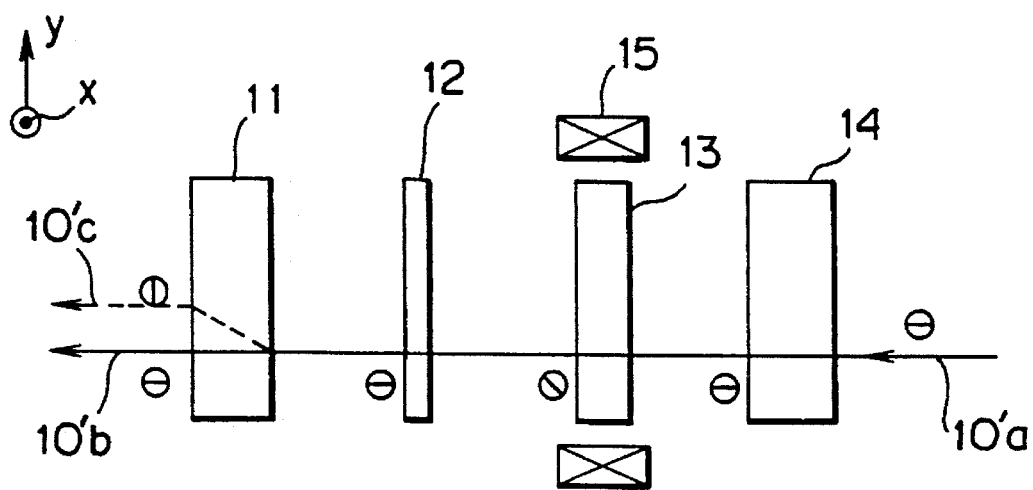

FIG. 7A and FIG. 7B are schematic diagrams showing such cases that linearly polarized light is incident upon the main body of the optical isolator.

As shown in FIG. 7A, linearly polarized light 10a (linearly polarized along the x axis in the view) which has been incident upon this optical isolator main body from the left side along the forward direction, is traveled through the half-wave plate 12 and the Farady rotator 13, so that the polarization plane thereof is apparently rotated by 90 degrees, and this linearly polarized light 10a is projected as emanating light 10b. If the crystal axis of the half-wave plate 12 is shifted by "Δθ" from a predetermined value, then not only the above-explained emanating light 10b whose polarization direction has been rotated by 90 degrees from that of the incident light 10a, but also a side spot 10c whose polarization direction is identical to that of the incident light 10a are produced.

Assuming now that the intensity of the linearly polarized light 10a along the x axis direction is selected to be 1, this linearly polarized light 10a is expressed by the following formula (1):

$$E_{in} = \begin{pmatrix} 1 \\ 0 \end{pmatrix} \quad (1)$$

Also, an angle "θ" defined between the polarization plane of the emanating light 10b and the x axis may be expressed by summing the rotation angle of the polarization plane at the half-wave plate 12 and the rotation angle of the polarization plane at the Farady rotator 13, and will be expressed by the following formula (2):

$$\begin{aligned} \theta &= -2(22.5 + \Delta\theta) - 45 \\ &= -90 - 2 \cdot \Delta\theta \end{aligned} \quad (2)$$

Accordingly, the emanating light is expressed by the below-mentioned formula (3):

$$\begin{aligned} E_{out} &= \begin{pmatrix} E_x \\ E_y \end{pmatrix} \\ &= \begin{pmatrix} \cos(-(90 + 2 \cdot \Delta\theta)) \\ \sin(-(90 + 2 \cdot \Delta\theta)) \end{pmatrix} \\ &= \begin{pmatrix} \sin(2\Delta\theta) \\ \cos(2\Delta\theta) \end{pmatrix} \end{aligned} \quad (3)$$

On the other hand, similarly, when the incident linearly polarized light is vibrated along the y axis direction (namely, it becomes extraordinary light in the birefringence crystal plate 11), emanating light can be obtained as expressed by the following formulae (4) to (6):

$$E_{in} = \begin{pmatrix} 0 \\ 1 \end{pmatrix} \quad (4)$$

$$\begin{aligned} \theta &= 90 - 2(22.5 + \Delta\theta) - 45 \\ &= -2 \cdot \Delta\theta \end{aligned} \quad (5)$$

$$\begin{aligned} E_{out} &= \begin{pmatrix} E_x \\ E_y \end{pmatrix} \\ &= \begin{pmatrix} \cos(-2 \cdot \Delta\theta) \\ \sin(-2 \cdot \Delta\theta) \end{pmatrix} \\ &= \begin{pmatrix} \cos(2 \cdot \Delta\theta) \\ \sin(2 \cdot \Delta\theta) \end{pmatrix} \end{aligned} \quad (6)$$

Accordingly, in any cases, the intensity ratio (extinction ratio) of the side spots is expressed by the following formula (7) (approximation is satisfied when the angle "Δθ" is sufficiently small):

$$\text{extinction ratio} = \frac{\sin^2(2 \cdot \Delta\theta)}{\cos^2(2 \cdot \Delta\theta)} \approx \sin^2(2 \cdot \Delta\theta) \quad (7)$$

When the extinction ratio is expressed in unit of dB, it may be expressed by the following formula (8):

$$\begin{aligned} \text{extinction ratio (dB)} &= -10\log_{10}\left(\frac{\sin^2(2 \cdot \Delta\theta)}{\cos^2(2 \cdot \Delta\theta)}\right) \\ &\approx -10\log_{10}(\sin^2(2 \cdot \Delta\theta)) \end{aligned} \quad (8)$$

Subsequently, consider that the linearly polarized light is incident upon the optical isolator main body along the reverse direction.

As indicated in FIG. 7B, the linearly polarized light 10'a (polarized along the x axis in the view) which has been incident upon this optical isolator main body along the right direction is traveled through the Farady rotator 13 and the half-wave length 12, so that this incident linearly polarized light 10'a is projected as emanating light 10'b having the polarization plane located along the same direction as that of the original condition. As previously explained, if the crystal axis of the half-wave plate 12 is shifted by "Δθ", then not only the emanating light 10'b whose polarization direction is identical to that of the incident light 10'a, but also a side spot 10'c whose polarization plane is rotated by 90 degrees from that of the incident light, are produced.

In this case, both an angle "θ" defined between the polarization plane of the emanating light and the x axis, and a component of the emanating light are expressed by the following formulae (9) and (10), respectively:

$$\begin{aligned} \theta &= -45 + 2(22.5 - \Delta\theta) \\ &= -2 \cdot \Delta\theta \end{aligned} \quad (9)$$

$$\begin{aligned} E_{out} &= \begin{pmatrix} \cos(-2.0 \cdot \Delta\theta) \\ \sin(-2.0 \cdot \Delta\theta) \end{pmatrix} \\ &= \begin{pmatrix} \cos(2 \cdot \Delta\theta) \\ \sin(2 \cdot \Delta\theta) \end{pmatrix} \end{aligned} \quad (10)$$

Similarly, in case that the linearly polarized light which has been incident upon the optical isolator main body along the reverse direction, is vibrated in the y axis direction, both an angle "θ" defined between the polarization plane of the emanating light and the y axis, and a component of the emanating light may be obtained as follows:

$$\theta = -45 - 2(22.5 + \Delta\theta) \quad (11)$$
$$= -90 - 2\Delta\theta$$

$$E_{out} = \begin{pmatrix} \cos(-90 - 2\cdot\Delta\theta) \\ \sin(-90 - 2\cdot\Delta\theta) \end{pmatrix} \quad (12)$$

$$= \begin{pmatrix} \sin(2\cdot\Delta\theta) \\ \cos(2\cdot\Delta\theta) \end{pmatrix}$$

As a consequence, in any cases, the components corresponding to the side spot are expressed by $\sin^2(2\cdot\Delta\theta)$.

Isolation of such an optical isolator may be expressed by a ratio of the intensity ($1^2$) of the incident light along the reverse direction to the side spot component of the emanating light along the reverse direction. Accordingly, the isolation is defined by the following equation (13):

$$\text{Isolation}(dB) = -10\log_{10}\left(\frac{\sin^2(2\cdot\Delta\theta)}{1^2}\right) \quad (13)$$

$$= -10\log_{10}(\sin^2(2\cdot\Delta\theta))$$

Thus, the calculated isolation is made coincident with the extinction ratio indicated by the formula (8). Therefore, if the absolute value of the above-described ratio is made small, the absolute value also becomes small, resulting in improving the isolation characteristic.

On the other hand, the extinction ratio defined by the formula (7) corresponds to a ratio of the minimum power level to the maximum power level, which is obtained in accordance with the measuring method of the present invention. As a consequence, it becomes evident that when the positional alignment of the respective optical elements would be controlled in accordance with the measuring method of the present invention so as to make the ratio of the minimum power level to the maximum power level minimal, the main body of the optical isolator with the superior isolation characteristic could be assembled.

Figure 3:
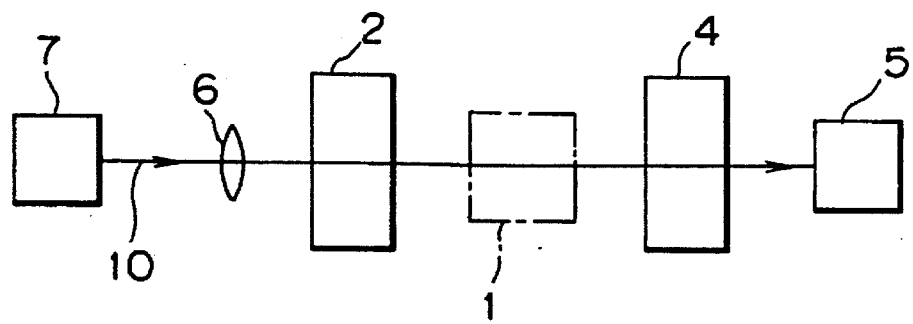
FIG. 3 is a schematic diagram showing one example of an isolation measuring system for embodying an isolation measuring method according to the present invention.
Figure 4:
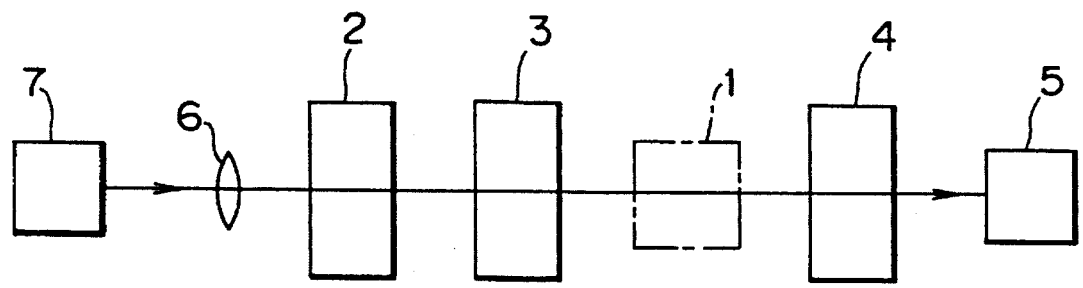
FIG. 4 is a schematic diagram showing another example of the isolation measuring system for embodying the isolation measuring method according of the present invention.
Figure 5:
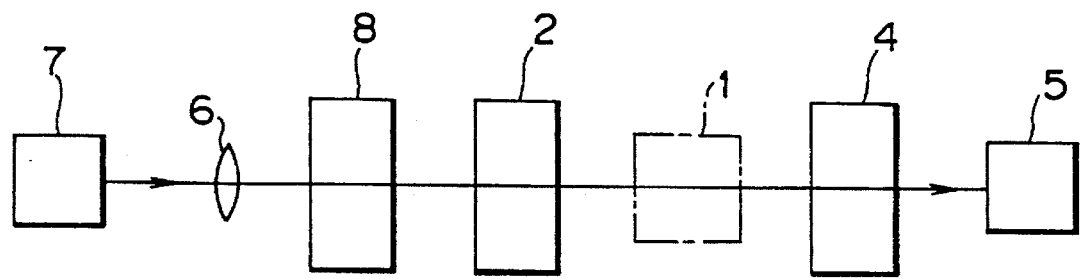
FIG. 5 is a schematic diagram showing another example of the isolation measuring system for embodying the isolation measuring method according to the present invention.

FIGS. 3 to 5 are schematic diagrams showing examples of measuring systems to carry out the isolation measuring method according to the present invention.

In the measuring system of FIG. 3, a polarizer 2 is arranged on one side of the optical isolator main body 1, and also an analyzer 4 is arranged on the other side thereof. Furthermore, a lens 6 and an optical source 7 are provided on the side of this polarizer 2, whereas a light receiver 5 is arranged on the side of the analyzer 4.

The measuring system shown in FIG. 4 is similar to that of FIG. 3 in which a half-wave plate 3 is furthermore arranged between the optical isolator main body 1 and the polarizer 2.

The measuring system shown in FIG. 5 is similar to that of FIG. 3 in which a ¼ wave plate 8 is additionally arranged between the polarizer 2 and the lens 6.

In accordance with the measuring method of the present invention, the light emitted from the light source 7 is incident upon the main body 1 of the optical isolator via the lens in such a manner that the linearly polarized light is incident thereupon as either the ordinary light, or the extraordinary light by using the measuring systems as shown, for example, in FIG. 3 to FIG. 5. Then, the analyzer 4 is rotated to measure the minimum power level and the maximum power level, which are obtained by the light receiver 5. The positional alignment of the respective elements for constituting the main body 1 of the optical isolator is controlled in order that the ratio of the maximum power level to the minimum power level becomes the minimum value.

It should be noted that although the positional alignment of the respective optical elements according to the measuring method of the present invention should be carried out in a predetermined sequence, as previously explained, the positional alignment of the half-wave plate 3 which greatly influences the isolation characteristics is preferably carried out at first, and thereafter the positional alignment of the birefringence crystal plate is performed. Since even when the Farady rotator is inclined within a range between +5 degrees and −5 degrees, substantially no adverse influence is given to the isolation characteristic, no positional alignment of this Farady rotator plate is normally required. It is of cause possible that only the half-wave plate is positional aligned in accordance with the method of the present invention.

Isolation may be evaluated by measuring the extinction ratio in accordance with the measuring method of the present invention. The measurement of this extinction ratio may be achieved by receiving all of the emanating light. As a result, the extinction ratio can be simply measured by merely employing such a light receiver with a large light receiving area, because neither the collimating lens is mounted on the side of the light receiver, nor the positional alignment thereof is required, which are conversely required in prior art.

A concrete example according to the present invention will now be described.

Wile measuring isolation of the main body of the optical isolator in accordance with the isolation measuring method of the present invention, the direction of the crystal axis of the half-wave plate 12, and also surface inclinations of the birefringence crystal plates 11, 14 and the Farady rotator 13, which constitute the main body 1 of the optical isolator, have been adjusted. As a result, the following adjustments could be achieved that the loss along the forward direction was 0.5 dB, the reflection attenuation amount was 58 dB, and isolation was higher than 40 dB.

The concrete procedure is carried out as follows:

a) First, the measuring system as represented in FIG. 3 is prepared. The polarization direction of the polarizer 2 is made coincident with that of the analyzer 4, whereby the light can be transmitted through the polarizer 2 and the analyzer 4.

b) Next, only the birefringence crystal plate 11 positioned on the light incident side of the isolation measurement system is arranged in the optical axis of the above-described measuring system, and the polarization directions of the polarizer 2 and the analyzer 4 are fine-adjusted in order that the power level of the transmission light becomes maximal.

c) Subsequently, the half-wave plate 12, the Farady rotator 13, and the refringence crystal plate 14 are inserted. At this time, the polarization plane of the light projected from the isolator main body is rotated by 90 degrees.

d) Next, the half-wave plate 12 is fine-rotated along the clockwise and counterclockwise directions, so that the intensity of the emanating light becomes minimal, under which the minimum power is measured. Also, the analyzer 4 is rotated by 90 degrees from the above-described condition, so that the maximum transmitting condition is established, under which the maximum power is measured. Then, the extinction ratio is calculated form the above-described formula (8) (extinction ratio=35.0 dB).

e) Then, the birefringence crystal plate 14 provided on the light projecting side is fine-rotated along the clockwise and counterclockwise directions, and is adjusted in a similar manner to that of the item d), whereby the extinction ratio is obtained (extinction ratio=38.5 dB).

f) A similar adjustment to that of the above-described item d) is again performed (extinction ratio= 39.5 dB).

g) A similar adjustment to that of the above-mentioned item e) is again carried out (extinction ratio=40.5 dB).

h) While the adjusting positions of the respective crystal plates are maintained, these crystal plates are fixed.

There is no specific limitation in such methods that the respective crystal plates are fixed to construct the optical isolator. As the concrete examples of these isolator constructing methods, there are provided a method such that the respective crystal plates are directly adhered to each other by employing such thermosetting resin adhesive or ultraviolet curing adhesive (such as epoxy resin adhesive), another method such that adapters for holding peripheral portions of the respective crystal plates are fixed on the corresponding crystal plate, and these adapters per se are fixed to each other by way of adhesive, soldering, or welding, and a further method such that the peripheral portions of the respective crystal plates are inserted into the grooves formed in a substrate and fixed therein by using proper adhesive. It should be noted that when the grooves are formed in the substrate to hold these crystal plates therein, since the crystal plates may be probably inclined along the front and rear directions if the width of the groove is wide, another fine adjustment along the front/rear directions should be carried out.

After the respective crystal plates per se have been fixed with each other in accordance with the above-described manner, the fixed crystal plates unit is further fixed on either a frame body provided with a magnet for magnetizing the Farady rotator 13, or a cylindrical frame body wholly made of a magnet, resulting in the main body 1 of the optical isolator. Then, this optical isolator main body 1 is assembled into a housing. In addition, a collimating lens and an optical fiber are assembled into this housing, if necessary.

Figure 8:
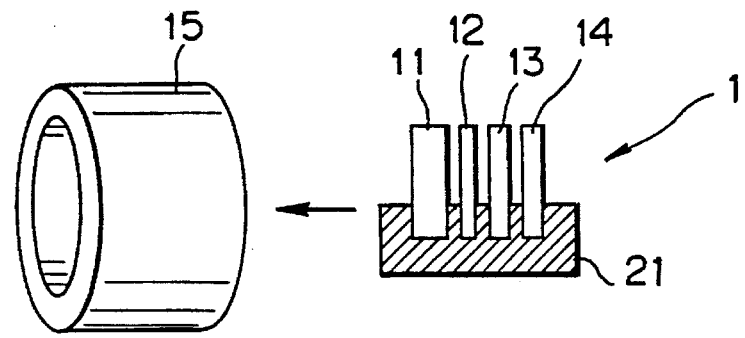
FIG. 8 is a schematic diagram showing one example of an assembling of the optical isolator main body.
Figure 9A:
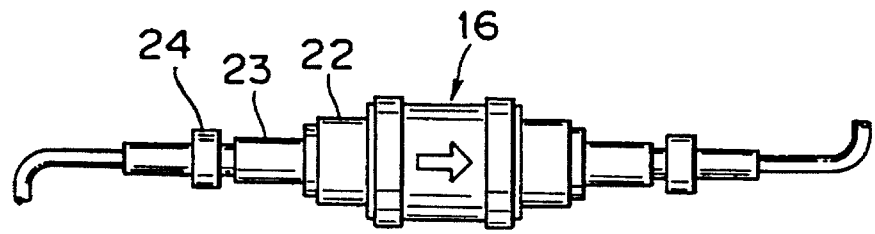
FIG. 9A is an outer diagram of the optical isolator according to an embodiment of the present invention.
Figure 9B:
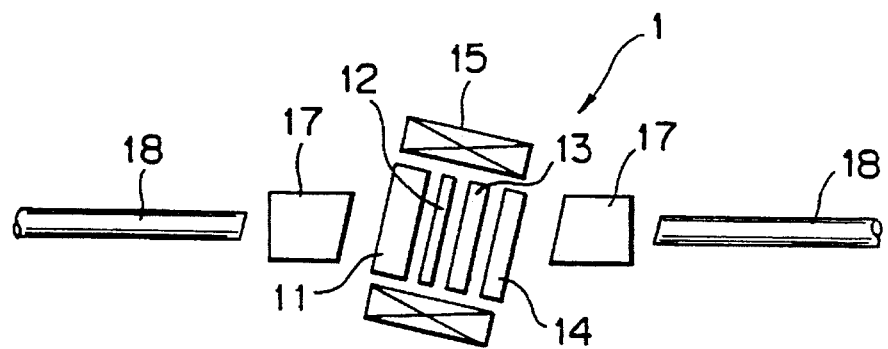
FIG. 9B a schematic view showing an structure of the optical isolator shown in FIG. 9A.

This example is represented in FIG. 8, FIG. 9A and FIG. 9B.

In FIG. 8, there is shown such an optical isolator that the birefringence crystal plate 11, the half-wave plate 12, the Farady rotator 13, and the birefringence crystal plate 14 are fixed on a silicon substrate 21 to construct an assembly, and then this assembly is fixed on a cylindrical magnet 15. FIG. 9A and FIG. 9B show an optical isolator into which the above-explained main body of the optical isolator has been assembled. More specifically, FIG. 9A represents an outer view of this optical isolator, and FIG. 9B schematically shows an internal structure of the optical isolator. In FIG. 9A and FIG. 9B, the main body 1 of the optical isolator has been assembled into a cylindrical metal housing 16, and a lens 17 supported by a lens holder 22 has been assembled into this housing 16. A ferrule 24 is fixed via a sleeve 23 on this lens holder 22, and an end portion of the optical fiber 18 is held by this ferrule 24.

It should be understood as to assembling of such an optical isolator, that since the optical isolator main body 1 has been adjusted and at the same time, the value of isolation about this main body 1 could be measured, the overall optical isolator could be assembled and adjusted within a short time.

To effectively carrying out the isolation measurement according to the present invention, it is desirable that the power level of the incident light is constant. On the contrary, since the light incident upon the polarizer 2 may own various polarization conditions, the power levels of the linearly polarized light obtained by rotating the polarizer 2 are not always constant.

As a consequence, it is required practice at the above-explained stage b) that the maximum transmitting condition could be found out. In other words, it is practically difficult to make such a discrimination that either the intensity variation happens to occur in the emanating light at the front/rear position where the angle defined between the crystal axis of the birefringence crystal plate and the polarization direction of the polarizer becomes 0 degree or 90 degrees, or the intensity variation happens to occur in the emanating light at the front/rear position where the polarization condition of the light is coincident with the polarization direction of the polarizer. Accordingly, to easily perform this work, it is preferable to employ an isolation measuring system as indicated in FIG. 4, or FIG. 5.

FIG. 4 is a schematic diagram showing the isolation system carrying out the isolation measuring method of the present invention. In this isolation measuring system, the half-wave plate 3 is interposed between the polarizer 2 and the main body 1 of the optical isolator. In this case, even when the angle of this polarizer 2 is selected to be an arbitrary angle, the polarization direction of the transmitting light can be rotated by rotating the half-wave plate 3. Therefore, half-wave plate 3 may be rotated instead of the polarizer 2 at the above-described stage b) in the preferred embodiment. As a result, the maximum transmitting condition may be readily found out.

FIG. 5 is a schematic diagram showing the isolation system embodying the isolation measuring method of the present invention. In this isolation measuring system, a quarter-wave plate 8 is inserted on the light incident side of the polarizer 2. In this case, the light incident upon the polarizer 2 becomes circularly polarized light. As a consequence, even when the polarizer 2 is rotated, the intensity of the light transmitted through this rotating polarizer 2 becomes constant. Under such a circumstance, the work at the stage b) of the above-described embodiment can be easily performed.

As previously described in detail, according to the present invention, isolation of the optical isolator can be obtained by simply measuring the maximum power level and the minimum power level when the polarizer is rotated by approximately as 90 degrees. Also, since no lens is employed in front of the light receiver while isolation of the optical isolator is measured, the precise axial alignment is no longer required, and therefore such a simple isolation measurement can be achieved.

Accordingly, while isolation of the optical isolator main body is measured, the alignment of the constructive components can be adjusted by utilizing the isolation measuring method of the present invention.

Moreover, isolation of the optical isolator main body is adjusted and thereafter the adjusted optical isolator main body is assembled into the housing, so that the overall optical isolator can be precisely adjusted and assembled within a short time.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A method for assembling an optical isolator, comprising the steps of:

constructing a measuring system in which a light source, a lens system, a polarizer, an analyzer, and a light receiver are arranged in this order, and light projected from said light source and then transmitted through said lens system, said polarizer, and said analyzer, is received by said light receiver;

arranging optical elements for constituting a main body of the optical isolator between said polarizer and said analyzer;

measuring a maximum value and a minimum value in levels of the light received by said light receiver while said analyzer is rotated, thereby to calculate a ratio of said minimum value to said maximum value; and adjusting rotation positions of said respective optical elements in order that said ratio becomes minimal.

2. A method for assembling an optical isolator as claimed in claim 1, wherein a half-wave plate is arranged on the light emanating side of said polarizer, and a positional alignment of said polarizer with respect to said main body of said optical isolator along the rotation direction is carried out by rotating said half-wave plate in stead of said polarizer.

3. A method for assembling an optical isolator as claimed in claim 1, wherein a quarter-wave plate is arranged on the light incident side of said polarizer.

4. A method for assembling an optical isolator, comprising the steps of:

constructing a measuring system in which a light source, a lens system, a polarizer, an analyzer, and a light receiver are arranged in this order, and light projected from said light source and then transmitted through said lens system, said polarizer, and said analyzer, is received by said light receiver;

arranging optical elements for constituting said main body of the optical isolator between said polarizer and said analyzer;

measuring a maximum value and a minimum value in levels of the light received by said light receiver while said analyzer is rotated every time said components are rotated and stopped, thereby to calculate a ratio of said minimum value to said maximum value; and adjusting rotation positions of said respective optical elements to the rotation position of said optical elements where a ratio of said maximum value to said minimum value becomes maximal.

5. A method for assembling an optical isolator as claimed in claim 4, wherein both the measurement of said maximum value and said minimum value, and also the adjustment of the rotation positions by said measurement are performed for each of the optical elements of said main body of the optical isolator.

6. A method for assembling an optical isolator as claimed in claim 4, wherein both the measurement of said maximum value and said minimum value, and also the adjustment of the rotation positions by said measurement are carried out for each of said optical elements of said main body of the optical isolator, and furthermore these measurement and adjustment operation are repeated several times.

7. A method for measuring isolation of an optical isolator, comprising the steps of:

constructing a measuring system in which a light source, a lens system, a polarizer, an analyzer, and a light receiver are arranged in this order, and light projected from said light source and then transmitted through said lens system, said polarizer, and said analyzer, is received by said light receiver;

arranging said main body of the optical isolator between said polarizer and said analyzer;

measuring a maximum value and a minimum value in levels of the light received by said light receiver while said analyzer is rotated; and setting as isolation a value indicative of a ratio of said minimum value to said maximum value in unit of dB.

8. A method for measuring isolation of an optical isolator as claimed in claim 7, wherein a half-wave plate is arranged on the light emanating side of said polarizer, and a positional alignment of said polarizer with respect to said main body of said optical isolator along the rotation direction is carried out by rotating said half-wave plate instead of said polarizer.

9. A method for measuring isolation of an optical isolator as claimed in claim 7, wherein a quarter-wave plate is arranged on the light incident side of said polarizer.

* * * * *